United States Patent
Abraham et al.

(10) Patent No.: US 8,464,138 B2
(45) Date of Patent: Jun. 11, 2013

(54) EFFECTIVE UTILIZATION OF HEADER SPACE FOR ERROR CORRECTION IN AGGREGATE FRAMES

(75) Inventors: Santosh P. Abraham, San Diego, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1098 days.

(21) Appl. No.: 12/259,105

(22) Filed: Oct. 27, 2008

(65) Prior Publication Data

US 2010/0050054 A1   Feb. 25, 2010

Related U.S. Application Data

(60) Provisional application No. 61/090,507, filed on Aug. 20, 2008.

(51) Int. Cl.
    *G06F 11/00* (2006.01)

(52) U.S. Cl.
    USPC .......................................... 714/776

(58) Field of Classification Search
    USPC .......................................... 714/776
    See application file for complete search history.

(56) References Cited

U.S. PATENT DOCUMENTS

| | | | |
|---|---|---|---|
| 6,434,191 B1 * | 8/2002 | Agrawal et al. | 375/227 |
| 6,678,502 B1 * | 1/2004 | Sugaya et al. | 455/74.1 |
| 6,807,648 B1 * | 10/2004 | Cansever et al. | 714/776 |
| 7,430,617 B2 * | 9/2008 | Walsh et al. | 709/247 |
| 7,613,139 B1 * | 11/2009 | Wang et al. | 370/311 |
| 7,633,970 B2 * | 12/2009 | van Kampen et al. | 370/473 |
| 7,688,856 B2 * | 3/2010 | Jang et al. | 370/469 |
| 7,738,391 B2 * | 6/2010 | Melpignano et al. | 370/252 |
| 7,916,641 B2 * | 3/2011 | Bourlas et al. | 370/235 |
| 7,940,777 B2 * | 5/2011 | Asati et al. | 370/395.52 |
| 7,953,115 B2 * | 5/2011 | Nataga et al. | 370/474 |
| 7,990,995 B2 * | 8/2011 | Nishibayashi et al. | 370/435 |
| 2004/0022252 A1 * | 2/2004 | Jang et al. | 370/395.52 |
| 2005/0015703 A1 * | 1/2005 | Terry et al. | 714/776 |
| 2005/0152358 A1 * | 7/2005 | Giesberts et al. | 370/389 |
| 2005/0152359 A1 | 7/2005 | Giesberts et al. | |
| 2007/0033496 A1 * | 2/2007 | Cooklev et al. | 714/776 |
| 2010/0142560 A1 * | 6/2010 | Sharivker et al. | 370/475 |

FOREIGN PATENT DOCUMENTS

| | | |
|---|---|---|
| CN | 1496059 A | 5/2004 |
| EP | 1589704 A2 | 10/2005 |
| EP | 1594284 A2 | 11/2005 |

(Continued)

OTHER PUBLICATIONS

International Search Report and Written Opinion—PCT/US2009/054516—ISA/EPO—Feb. 9, 2010.

(Continued)

*Primary Examiner* — Scott Baderman
*Assistant Examiner* — Elmira Mehrmanesh
(74) *Attorney, Agent, or Firm* — Dang M. Vo

(57) ABSTRACT

An apparatus for wireless communications is disclosed that includes a processing system configured to generate a first data packet and thereafter a second data packet, wherein each of the first and second data packets including a header and data, the processing system being further configured to generate an error correction code associated with the first data packet and embed the error correction code in the header of the second data packet.

64 Claims, 8 Drawing Sheets

FOREIGN PATENT DOCUMENTS

| | | |
|---|---|---|
| JP | 04025258 | 1/1992 |
| JP | 2003522474 A | 7/2003 |
| JP | 2005184839 A | 7/2005 |
| JP | 2005311920 A | 11/2005 |
| TW | 256216 B | 6/2006 |
| TW | 269169 B | 12/2006 |
| TW | 200807932 A | 2/2008 |
| WO | WO2005060339 A2 | 7/2005 |
| WO | WO2008018690 A1 | 2/2008 |

OTHER PUBLICATIONS

Taiwan Search Report—TW098128141—TIPO—Sep. 18, 2012.

* cited by examiner

EFFECTIVE UTILIZATION OF HEADER SPACE FOR ERROR CORRECTION IN AGGREGATE FRAMES

CLAIM OF PRIORITY UNDER 35 U.S.C. §119

The present Application for Patent claims priority to Provisional Application No. 61/090,507 entitled "EFFECTIVE UTILIZATION OF HEADER SPACE FOR ERROR CORRECTION IN AGGREGATE FRAMES" filed Aug. 20, 2008, and assigned to the assignee hereof and hereby expressly incorporated by reference herein.

BACKGROUND

I. Field

The following description relates generally to communication systems, and more particularly to error correction and resource efficiency in a wireless network.

II. Background

In communication systems, transmission of information is prone to error. The errors may be introduced due to ambient thermal noise or interference from another device operating in the same frequency band. Many current wireless technologies incorporate some sort of an error detecting code to selectively reject received frames that are erroneous. For example, the 802.11 standard as promulgated by the Institute of Electrical or Electronic Engineers (IEEE), herein referred to as 802.11, includes a 32-bit cyclical redundancy code (CRC) to check for errors. In addition to error detecting codes, many current wireless technologies also incorporate error correcting codes. These codes, implementing redundancy in coding, can correct bit errors introduced by the channel. The strength of the error correction code—that is, the ability of the error correction code to correct errors, is dependent on the amount of redundancy that is introduced into the bit stream.

802.11-based wireless network systems do not incorporate error correction mechanisms for correcting received frames that contain errors. One reason for not incorporating an error correction mechanism is that the introduction of the extra information bits in the frame that are needed for error correction will result in an underutilization of bandwidth resources. It would be desirable to use any pre-existing but redundant bits in a particular frame to carry error correction information while not increasing frame size. Further, any proposed solution should not require significant hardware changes.

Consequently, it would be desirable to address one or more of the deficiencies described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods for wireless communication, where a processing system is configured to generate a first data packet and thereafter a second data packet, wherein each of the first and second data packets includes a header and data, the processing system being further configured to generate an error correction code associated with the first data packet and embed the error correction code in the header of the second data packet.

The subject innovation further relates to systems and/or methods for wireless communications having a processing system configured to receive a first data packet followed by a second data packet, wherein each of the first and second data packets includes a header and data, and wherein the header for the second data packet includes an error correction code associated with the first data packet, the processing system being further configured to use the error correction code in the header of the second data packet to decode the first data packet.

The subject innovation further relates to systems and/or methods for generating a first data packet and thereafter a second data packet, wherein each of the first and second data packets having a header and data; generating an error correction code associated with the first data packet; and embedding the error correction code in the header of the second data packet.

The subject innovation further relates to systems and/or methods for receiving a first data packet followed by a second data packet, wherein each of the first and second data packets includes a header and data, and wherein the header for the second data packet includes an error correction code associated with the first data packet; and, using the error correction code in the header of the second data packet to decode the first data packet.

The subject innovation further relates to systems and/or methods for wireless communications having means for generating a first data packet and thereafter a second data packet, wherein each of the first and second data packets includes a header and data; means for generating an error correction code associated with the first data packet; and means for embedding the error correction code in the header of the second data packet.

The subject innovation further relates to systems and/or methods for wireless communications having means for receiving a first data packet followed by a second data packet, wherein each of the first and second data packets includes a header and data, and wherein the header for the second data packet includes an error correction code associated with the first data packet; and means for using the error correction code in the header of the second data packet to decode the first data packet.

The subject innovation further relates to a computer-program product for communication having a machine-readable medium encoded with instructions executable by to: generate a first data packet and thereafter a second data packet, wherein each of the first and second data packets includes a header and data; and generate an error correction code associated with the first data packet and embed the error correction code in the header of the second data packet.

The subject innovation further relates to a computer-program product for communication having a machine-readable medium encoded with instructions executable by to: receive a first data packet followed by a second data packet, wherein each of the first and second data packets includes a header and data, and wherein the header for the second data packet includes an error correction code associated with the first data packet; and use the error correction code in the header of the second data packet to decode the first data packet.

The subject innovation further relates to an access point having a wireless network adapter configured to support a backhaul connection for a peer node to a network; and a processing system configured to generate a first data packet and thereafter a second data packet, wherein each of the first and second data packets includes a header and data, the processing system being further configured to generate an error correction code associated with the first data packet and embed the error correction code in the header of the second data packet.

The subject innovation further relates to an access terminal including a processing system configured to receive a first data packet followed by a second data packet, wherein each of the first and second data packets includes a header and data, and wherein the header for the second data packet includes an error correction code associated with the first data packet, the processing system being further configured to use the error correction code in the header of the second data packet to decode the first data packet; and a user interface supported by the processing system.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

These and other sample aspects of the invention will be described in the detailed description that follow, and in the accompanying drawings, wherein.

Figure 1:
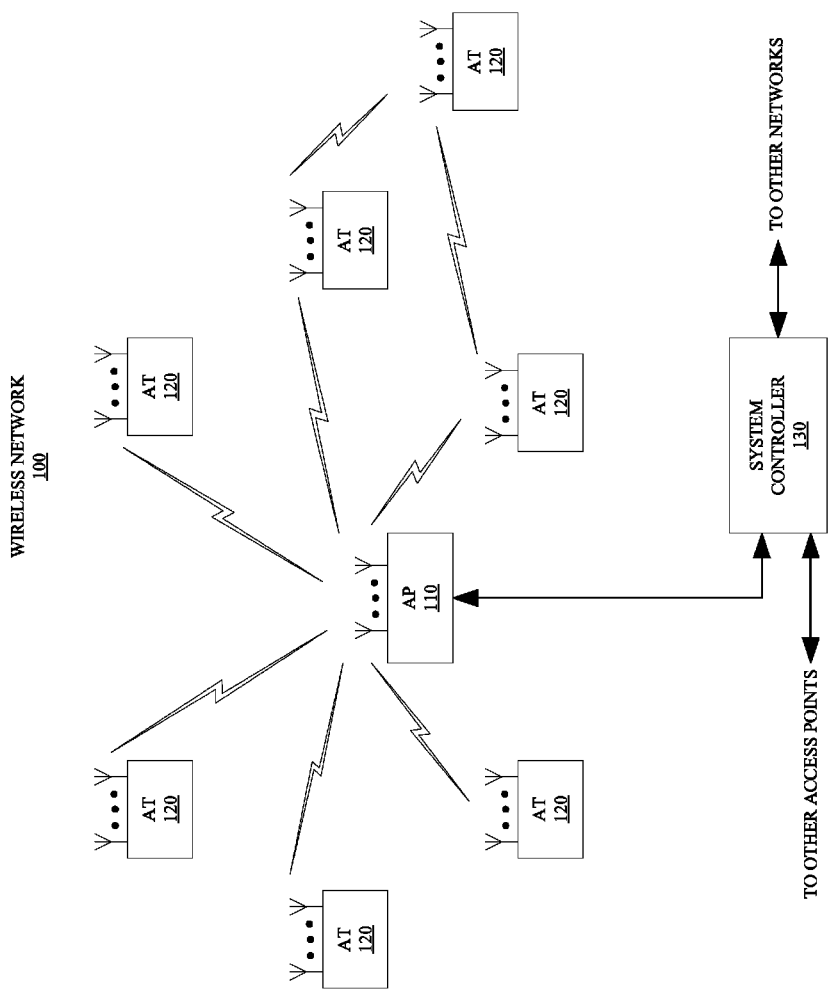
FIG. 1 is a diagram of a wireless communications network.

In accordance with common practice the various features illustrated in the drawings may be simplified for clarity. Thus, the drawings may not depict all of the components of a given apparatus (e.g., device) or method. In addition, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Several aspects of a wireless network will now be presented with reference to FIG. 1. The wireless network 100 is shown with several wireless nodes, generally designated as nodes 110 and 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage; however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme that enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream.

One or more access terminals 120 may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a technique that distributes data over a number of subcarriers spaced apart at precise frequencies. The spacing provides "orthogonality" that enables a receiver to recover the data from the subcarriers. An OFDM system may implement 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
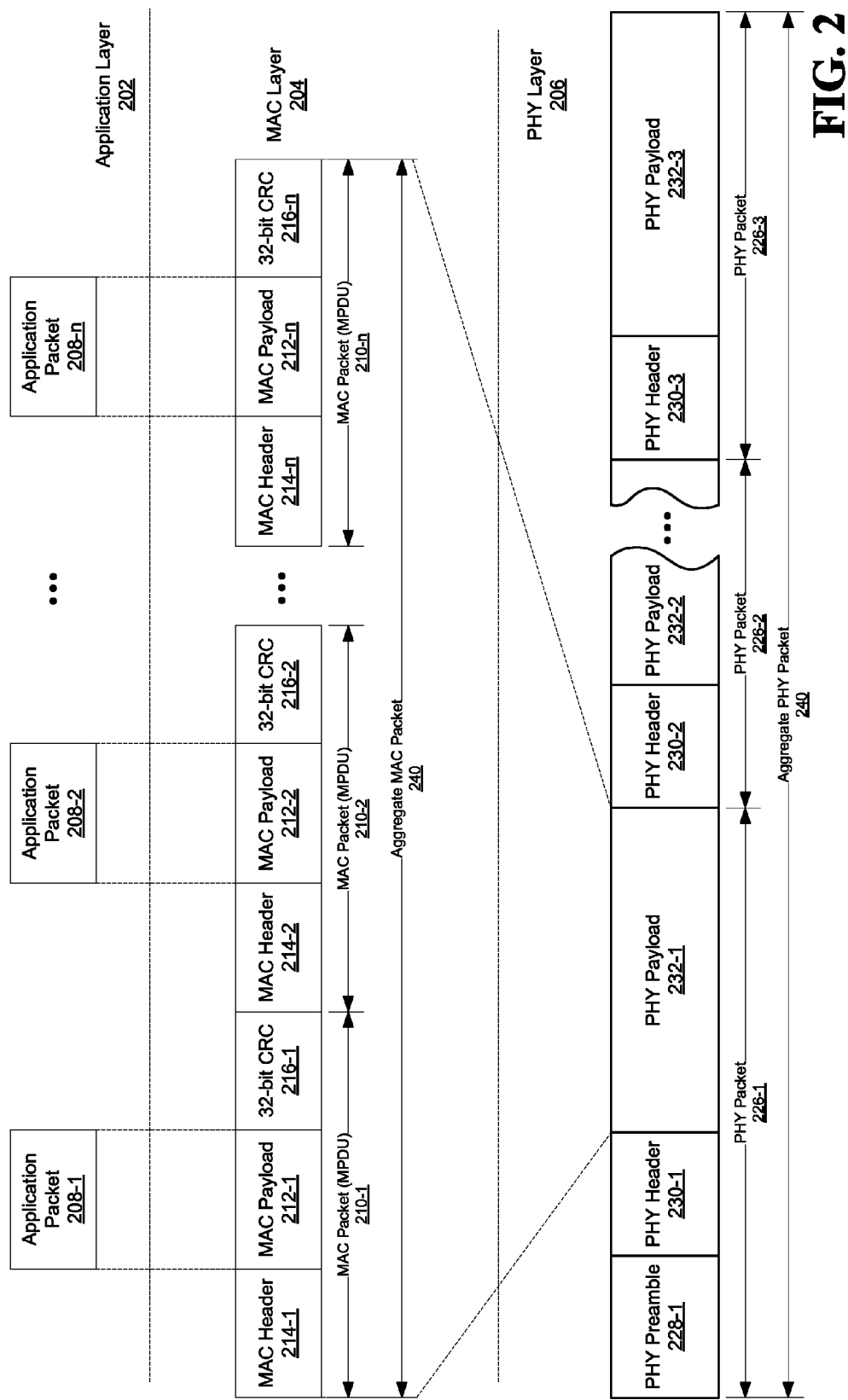
FIG. 2 is a block diagram of a typical structure of an MPDU with CRC.

A wireless node, whether it is an access point (AP) or access terminal (AT), may be implemented with a protocol that utilizes a layered structure. By way of example, as shown in FIG. 2, a layered structure 200 may include an application layer 202, a Medium Access Control (MAC) layer 204 and a physical (PHY) layer 206. The physical layer 206 implements all the physical and electrical specifications to interface the wireless node to the shared wireless channel. The MAC layer 204 coordinates access to the shared wireless channel and is used to interface higher layers, such as the application layer 202, to the PHY layer 206. The application layer 202 performs various data processing functions including, by way of example, speech and multimedia codecs and graphics processing. Additional protocol layers (e.g., network layer, transport layer) may be required for any particular application. In some configurations, the wireless node may act as a relay point between an access point and an access terminal, or two access terminals, and therefore, may not require an application layer 202. Those skilled in the art will be readily able to implement the appropriate protocol for any wireless node depending on the particular application and the overall design constraints imposed on the overall system.

When the wireless node is in a transmit mode, the application layer 202 processes data, segments the data into a plurality of application data packets 208-1 to 208-n, and provides the plurality of application data packets 208-1 to 208-n to the MAC layer 204. The MAC layer 204 assembles a plurality of MAC packets 210-1 to 210-n, with each application data packet of the plurality of application data packets 208-1 to 208-n from the application layer 202 being carried by a payload of a MAC packet of the plurality of MAC packets 210-1 to 210-n. A MAC packet is sometimes referred to as a MAC Protocol Data Unit (MPDU), but may also be referred to as a frame, sub frame, packet, timeslot, segment, or any other suitable nomenclature.

In addition to a payload portion, each MAC packet includes a MAC header and an error detection mechanism. For example, 802.11-based wireless network systems incorporate a 32-bit CRC error detection mechanism at the end of each MAC packet. FIG. 2 indicates a typical structure of an MPDU with a CRC portion where the MAC packet (MPDU) 210-1 includes a MAC header 214-1 and a 32-bit CRC 216-1 in addition to the MAC payload 212-1. Although FIG. 2 shows one application layer data packet per each MAC packet, it is possible to incorporate multiple application layer data packets into the payload of one MAC packet. Alternatively, multiple application layer data packets may be fragmented and distributed over more than one MAC packet. The MAC packets 210-1 to 210-n are then placed into the payload of a PHY layer packet to be transmitted, as further described herein.

The partial PHY packet shown in FIG. 2 is an aggregate PHY layer packet 240 and includes a single PHY layer preamble 228-1. Following the PHY preamble 228-1 are three (although fewer or more than three are possible) PHY layer payloads 232-1 to 232-3, each one of which is preceded by a corresponding PHY layer header 230-1 to 230-3. Each of the PHY layer payloads 232-1 to 232-3 includes an aggregate MAC packet with a structure that will be explained further herein. Each MAC packet in an aggregate MAC packet is delivered to a same receiving station. However, each of the PHY layer payloads in the aggregate PHY layer packet may be transmitted to the same or different receiving stations. A field is provided before each PHY layer payload to direct the MAC packets in that payload to the correct station. However, only one PHY layer preamble is required for the entire aggregate PHY layer packet. Hence, only one PHY layer preamble is required for multiple MAC packets, even if they are being transmitted to different stations. All stations can estimate the channel, synchronize and calculate the AGC gain using one preamble. Combining PHY layer payloads in an aggregate PHY layer packet allows for removal of inter frame spacing between aggregate MAC packets as well as aggregation of the preambles (training fields) for multiple aggregate MAC packets.

Although FIG. 2 shows one aggregate MAC packet per PHY layer payload, each PHY layer payload may include more than one aggregate MAC packet. Alternatively, multiple aggregate MAC packets may be fragmented and distributed over more than one PHY layer payload.

In some aspects, multiple MAC packets having an identical destination address are combined into a structure referred to as an aggregate MAC packet. An aggregate MAC packet is sometimes referred to as an aggregate MAC protocol data unit (AMPDU) or an aggregate frame. An example of an aggregate frame is illustrated in FIG. 3 as an aggregate frame 302.

In an aggregate frame, each MAC packet (including its MAC header and MAC payload as well as error checker) in the aggregate frame is pre-pended with a sub frame header. A MAC packet having a pre-pended sub frame header is referred to herein as an AMPDU sub frame or, simply, a sub frame. An aggregate frame such as the aggregate frame 302 is made up of several such sub frames, such as a plurality of sub frames 312-1 to 312-n. In the example as shown in FIG. 3, the sub frame 312-1 includes a MAC packet 324 pre-pended with a sub frame header 322 and appended with a padding 326. As discussed above with reference to FIG. 2, each MAC packet includes a MAC header field, a MAC payload portion, and an error checking mechanism. In the example as shown, the MAC packet 324 includes a MAC header 342, a MAC payload 344 and a 32-bit CRC error checker 346, which is used to detect an error over the entire sub frame, including the MAC header 342 and data contained in the MAC payload 344.

Each sub frame header may include a length field, an error detector and a delimiter signature. The beginning and end of each sub frame may be determined by the length field and delimiter signature. The error detector may comprise a cyclic redundancy check, which is a checksum, for example, and enables verification of each respective sub frame independently. For example, sub frame header 322 includes a MPDU length field 334, which contains the length of a sub frame—in this case the length of sub frame 312-1; a 16-bit CRC error detector 336; and a delimiter signature 338 used to detect a new packet. In case an MPDU is in error, an efficient way to detect the start of the next MPDU is to search for a delimiter signature.

Figure 3:
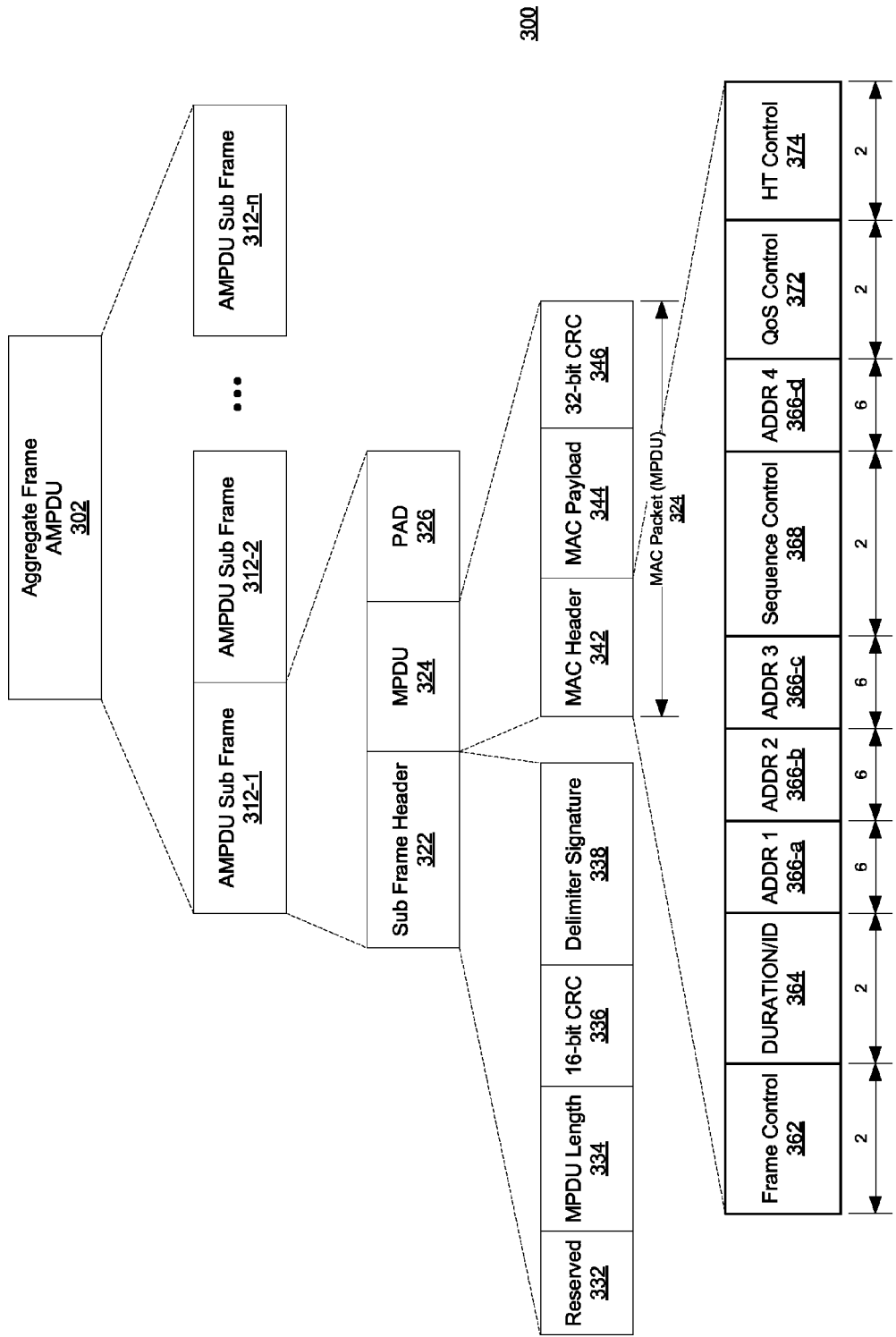
FIG. 3 illustrates the structure of an AMPDU aggregate frame.

Although FIG. 3 shows one MAC packet per sub frame, each sub frame may include more than one MAC packet. Alternatively, multiple MAC packets may be fragmented and distributed over more than one sub frame.

In 802.11, MAC headers can be either 28 bytes or 34 bytes. As illustrated in FIG. 3, MAC header 342 is 34 bytes long and has a plurality of address fields ADDR1, ADDR2, ADDR3, and ADDR4 366-a to 366-d. The MAC header 342 also includes a QoS control field 372 and an HT control field 374. In case the MAC header is 28 bytes long, ADDR4 is not present.

The frame control field 362, the duration/ID field 364, the sequence control field 368, the QoS control field 372 and the HT control field 374 are each 2-bytes in length. The plurality of address fields ADDR1, ADDR2, ADDR3, and ADDR4 366-a to 366-d are each 6-bytes in length.

The QoS control field 372 carries information with respect to the flow of packets and can be different between each sub frame when the multi-Traffic Identifier (TID), which is defined for each traffic stream that is present in the access point, aggregates and block acknowledgements (ACK) are supported.

The sequence control field 368 uniquely identifies each MAC packet, such as MAC packet 324, which allows duplicate packet detection, retransmission of corrupted frames and in-order delivery to upper layers. Thus, similar to the QoS control field 372, the sequence control field 368 is another field that has to be unique for each transmitted/received sub frame.

Although the QoS control field 372 and sequence control field 368 have to be unique for each of the MAC packets (or all sub frames, in a aggregate frame in this case where each sub frame only contains one MAC packet), certain fields are redundant and can be used advantageously for error correction.

Currently, in 802.11n, the above-discussed concept of MPDU aggregation is used to increase the efficiency of the MAC layer by packing multiple MPDUs "back-to-back" to create an aggregate frame structure. Frame aggregation at the MAC layer level also allows for the removal of spaces, referred to as inter-frame spaces, between the MAC packets (i.e., the sub frames). Frame aggregation also allows the removal of redundancies in the MAC headers, which is a process referred to as header compression. For example, if each MAC packet in an aggregate frame is to be transmitted to the same receiving station, the destination address may be eliminated from the MAC headers of the sub frames following the first sub frame in the aggregate frame.

For example, due to the mandatory feature in 802.11n where the individual frames within the aggregate frame are all destined to the same destination station, the ADDR1, ADDR2, ADDR3, ADDR4, frame control, and the HT control fields will be common to every sub frame that is embedded in an aggregate frame. For example, the ADDR1, ADDR2, ADDR3, ADDR4 fields 366a-d, the frame control field 362, and the HT control field 374 will be common to sub frame 312-1. The Duration/ID field 364 is also a redundant field because the length of the sub frame is already present in the sub frame header 322.

This indicates that up to 26 bytes of information in the MAC header 342 (and 32 bytes of MAC header information in case of ESS) in the second sub frame 312-2 and all subsequent sub frames 312-3 to 312-n will be redundant information, provided the first sub frame 312-1 can be decoded without any errors. Thus, instead of eliminating the information that would be used for removal of the inter-frame spaces or header compression, the bits used to carry the heretofore redundant information may be used to perform error correction.

In one aspect, a daisy chain approach for an error correction process is used to provide error correction when a particular aggregate frame carries two or more sub frames. In one aspect of the error correction process, portions of the information in the MAC headers in the second and subsequent sub frames are used to embed error correcting codes for previous frames. Generally, the portions of the MAC headers that are used will be redundant in the context of the frame structure.

Referring to FIG. 3, the ADDR2 and ADDR3 fields of the MAC headers of the second and subsequent sub frames 312-2 to 312-n will be used to carry the error correction information for previous sub frames. In one aspect, at the transmitter, the CRC of the MPDU in the current sub frame is computed without the error correction information in these fields, but, instead, the CRC of the MPDU in the current sub frame will be computed using the receiver's MAC address and the BSSID as the values of the ADDR2 and ADDR3 fields, respectively. The ADDR1 field, containing the transmitter address, is filled out as it is at the transmitter. The reason for this is that when the receiving station receives the second and subsequent sub frames 312-2 to 312-n, with the first sub frame having been received in error, the receiving station can use the ADDR1 field to determine the address of the transmitter. To compute the CRC, the receiving station will first substitute its own MAC address for the ADDR2 field and the BSSID for the ADDR3 field.

Figure 4:
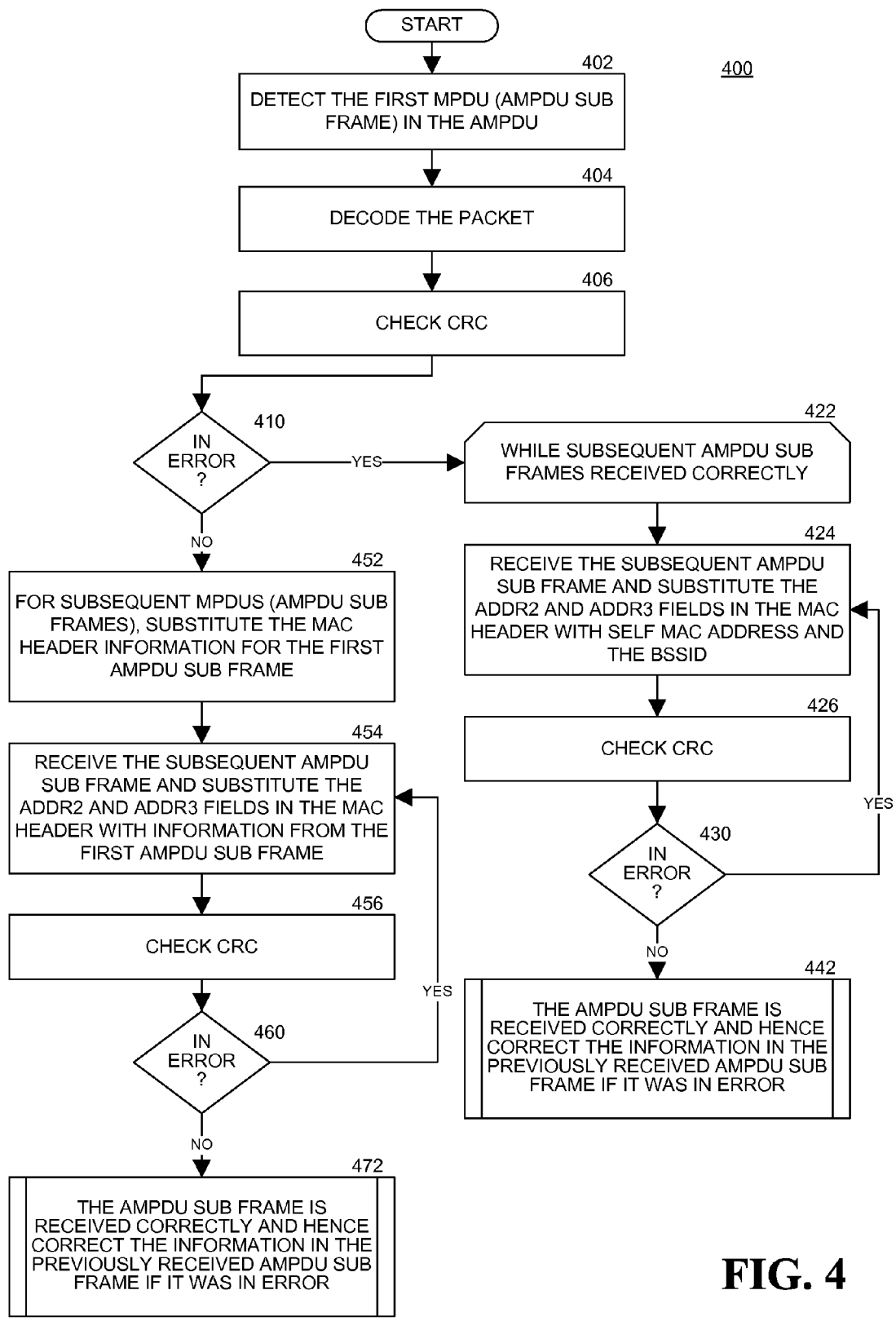
FIG. 4 illustrates an algorithm for an error correction mechanism.

FIG. 4 illustrates an error correction process 400 for implementing an error correction mechanism in one aspect, where in step 402, a receiving station will detect a first sub frame, such as sub frame 312-1. The receiving station will then attempt to decode the first sub frame in step 404 before performing a CRC of the decoded data in step 406.

If this frame was received without any errors, as determined in step 410 using the CRC check results from step 406, the information extracted from the ADDR2 and ADDR3 fields, such as the ADDR2 and ADDR3 fields 366-b, 366-c, respectively, will be determinable and will be substituted for the corresponding fields for all subsequent sub frames, as shown in step 452. However, if it is determined in step 410 that the first sub frame 312-1 is not received correctly—i.e., the CRC process fails in step 406; then the first sub frame 312-1 is stored to perform error correction after an attempt is made to decode the second or subsequent sub frames, as described below.

If the first sub frame was in error as determined is step 410, then, upon receiving the second sub frame, the ADDR2 and ADDR3 fields of this sub frame are substituted with the MAC address of the receiving station and the BSSID in step 424.

The CRC is then computed for this sub frame in step 426. If the second frame was received without any error (i.e., the CRC check passes in step 426), as determined in step 430, then the error correction information held in the ADDR2 and ADDR3 field of this received frame is used to correct the erroneously received first sub frame in step 442. If the errors can be corrected, the first sub frame is salvaged. Otherwise, it is dropped and the unsuccessful receipt will be indicated to the transmitter by an ACK/Block ACK ARQ mechanism.

If the second sub frame is also received in error, as determined in step 430, then this second sub frame is also stored and will be decoded with the error correction information that will be obtained from the third or the subsequent sub frame. Thus, operation will return to step 424 from step 430.

Returning to step 410, if the CRC check in step 406 does not indicate an error in the receipt of the first sub frame 312-1, then operation continues with step 452 where, for subsequent sub frames, the MAC header information will be substituted with the information retrieved from the first sub frame 312-1.

In step 454, subsequent sub frames are received and information in the ADDR2 and ADDR3 fields for these sub frames will be replaced with the same information retrieved from the first sub frame 312-1 before a CRC check is performed in step 456. If an error is determined from the CRC check in step 460, then operation will return to step 454. Otherwise, operation continues with step 472.

In step 472, the sub frame has been received correctly and information therefrom may be used to correct previously erroneous sub frames.

By using this approach for error correction, every sub frame (within the limits of error correction code strength) but for the last sub frame in an aggregate frame that are erroneously received can be corrected and salvaged. This reduces the number of retransmissions and hence increases the efficiency of the MAC layer.

In another aspect, the error correction process may be further enhanced by providing more correction bits when ready-to-send/clear-to-send (RTS/CTS) messages are exchanged in an aggregate transmission. When RTS/CTS messages are used prior to an aggregate transmission, the receiver acquires the knowledge of the address of the transmitter. Hence now, the ADDR1 can also be used for embedding the error correction information, further increasing the chances of correcting a previously incorrectly received sub frame.

In one aspect, before transmitting an error correcting frame, the transmitter has to indicate such kind of transmission to the receiving station so that the receiving station will correctly know how to decode the specific kind of packet. In one aspect, this information can be indicated to the receiving station by using either a code or a single bit to indicate this in a particular signal field.

Figure 5:
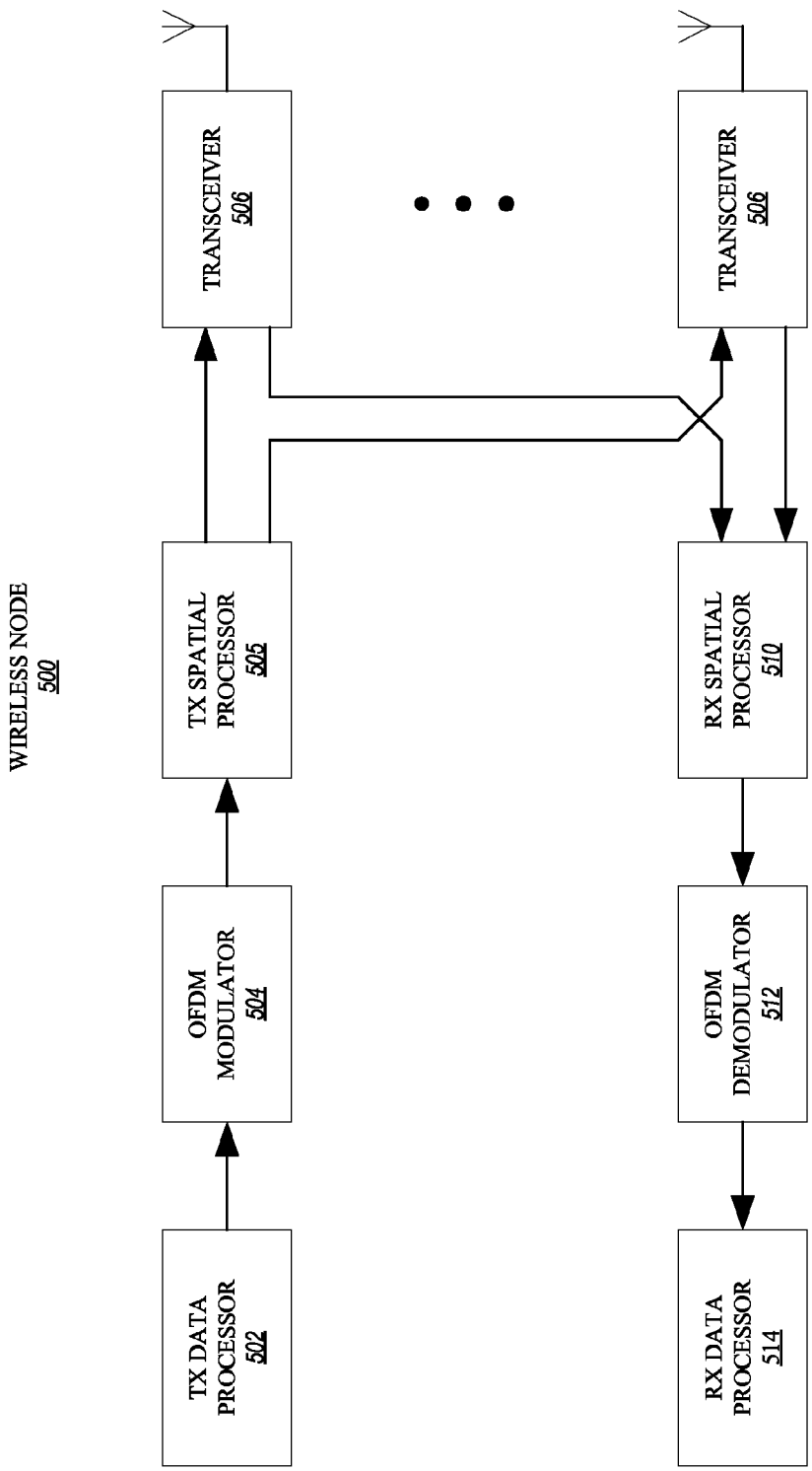
FIG. 5 is a block diagram of an example of signal processing functions of a PHY layer of a wireless node in the wireless communications network of FIG. 1.

FIG. 5 is a conceptual block diagram illustrating an example of the signal processing functions of the PHY layer. In a transmit mode, a TX data processor 502 may be used to receive data from the MAC layer and encode (e.g., Turbo code) the data to facilitate forward error correction (FEC) at the receiving node. The encoding process results in a sequence of code symbols that that may be blocked together and mapped to a signal constellation by the TX data processor 502 to produce a sequence of modulation symbols.

In wireless nodes implementing OFDM, the modulation symbols from the TX data processor 502 may be provided to an OFDM modulator 504. The OFDM modulator splits the modulation symbols into parallel streams. Each stream is then mapped to an OFDM subcarrier and then combined together using an Inverse Fast Fourier Transform (IFFT) to produce a time domain OFDM stream.

A TX spatial processor 505 performs spatial processing on the OFDM stream. This may be accomplished by spatially precoding each OFDM and then providing each spatially precoded stream to a different antenna via a transceiver 506. Each transceiver 506 modulates an RF carrier with a respective precoded stream for transmission over the wireless channel.

In a receive mode, each transceiver 506 receives a signal through its respective antenna. Each transceiver 506 may be used to recover the information modulated onto an RF carrier and provide the information to a RX spatial processor 510.

The RX spatial processor 510 performs spatial processing on the information to recover any spatial streams destined for the wireless node 500. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 500, they may be combined by the RX spatial processor 510.

In wireless nodes implementing OFDM, the stream (or combined stream) from the RX spatial processor 510 is provided to an OFDM demodulator 512. The OFDM demodulator 512 converts the stream (or combined stream) from time-domain to the frequency domain using a Fast Fourier Transform (FFT). The frequency domain signal comprises a separate stream for each subcarrier of the OFDM signal. The OFDM demodulator 512 recovers the data (i.e., modulation symbols) carried on each subcarrier and multiplexes the data into a stream of modulation symbols.

A RX data processor 514 may be used to translate the modulation symbols back to the correct point in the signal constellation. Because of noise and other disturbances in the wireless channel, the modulation symbols may not correspond to an exact location of a point in the original signal constellation. The RX data processor 514 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 514 then uses the sequence of code symbol LLRs in order to decode the data that was originally transmitted before providing the data to the MAC layer.

Figure 6:
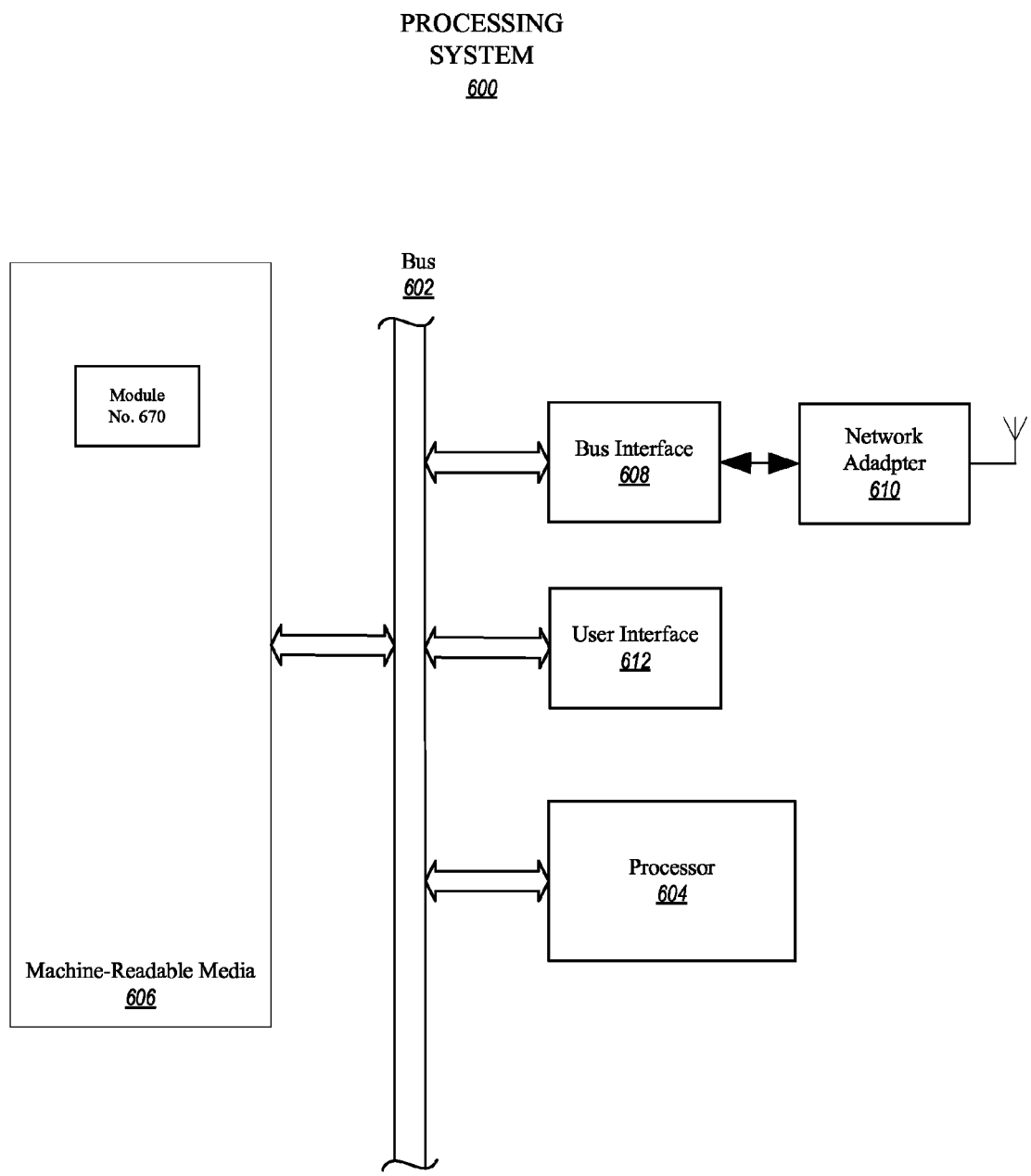
FIG. 6 is a block diagram illustrating an exemplary hardware configuration for a processing system in a wireless node in the wireless communications network of FIG. 1.

FIG. 6 is a conceptual diagram illustrating an example of a hardware configuration for a processing system 600 in a wireless node. In this example, the processing system 600 may be implemented with a bus architecture represented generally by bus 602. The bus 602 may include any number of interconnecting buses and bridges depending on the specific application of the processing system 600 and the overall design constraints. The bus links together various circuits including a processor 604, machine-readable media 606, and a bus interface 608. The bus interface 608 may be used to connect a network adapter 610, among other things, to the processing system 600 via the bus 602. The network adapter 610 may be used to implement various signal processing functions, such as the signal processing functions of the PHY layer. In the case the processing system is used in an access terminal 120 (see FIG. 1), a user interface 612 (e.g., keypad, display, mouse, joystick, etc.) may also be connected to the bus. The bus 602 may also link various other circuits such as timing sources, peripherals, voltage regulators, power management circuits, and the like, which are well known in the art, and therefore, will not be described any further.

The processor 604 is responsible for managing the bus and general processing, including the execution of software stored on the machine-readable media 608. The processor 604 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In the hardware implementation illustrated in FIG. 6, the machine-readable media 606 is shown as part of the processing system 600 separate from the processor 604. However, as those skilled in the art will readily appreciate, the machine-readable media 606, or any portion thereof, may be external to the processing system 600. By way of example, the machine-readable media 606 may include a transmission line, a carrier wave modulated by data, and/or a computer product separate from the wireless node, all which may be accessed by the processor 604 through the bus interface 608. Alternatively, or in addition to, the machine readable media 606, or any portion thereof, may be integrated into the processor 604, such as the case may be with cache and/or general register files.

The processing system 600 may be configured as a general-purpose processing system with one or more microprocessors providing the processor functionality and external memory providing at least a portion of the machine-readable media 606, all linked together with other supporting circuitry through an external bus architecture. Alternatively, the processing system 600 may be implemented with an ASIC (Application Specific Integrated Circuit) with the processor 604, the bus interface 608, the user interface 612 in the case of an access terminal), supporting circuitry (not shown), and at least a portion of the machine-readable media 606 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 600 depending on the particular application and the overall design constraints imposed on the overall system.

The machine-readable media 606 is can contain a number of software modules. The software modules include instructions that when executed by the processor 604 cause the processing system 600 to perform various functions. Each software module may reside in a single storage device or distributed across multiple storage devices. By way of example, a software module may be loaded into RAM from a hard drive when a triggering event occurs. During execution of the software module, the processor 604 may load some of the instructions into cache to increase access speed. One or more cache lines may then be loaded into a general register file for execution by the processor 604. When referring to the functionality of a software module, it will be understood that such functionality is implemented by the processor 604 when executing instructions from that software module. For example, the process described in the error correction process 400 may be implemented by the processor 604 executing instructions contained in a software module 670 as shown in the figure.

Figure 7:
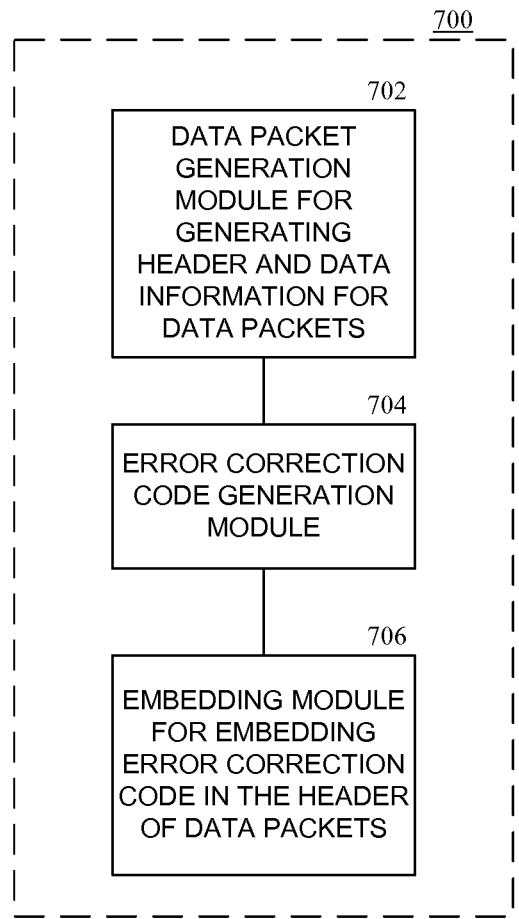
FIG. 7 is a block diagram illustrating an exemplary apparatus for wireless communications having various modules operable to implement error correction codes.

FIG. 7 is a block diagram illustrating an exemplary apparatus 700 for wireless communications having various modules operable to implement error correction codes. A data packet generation module 702 is used for generating a first data packet and thereafter a second data packet, wherein each of the first and second data packets includes a header and data. An error correction code generation module 704 generates an error correction code associated with the first data packet from the data packet generation module 702. An embedding module 706 is used to embed the error correction code in the header of the second data packet.

Figure 8:
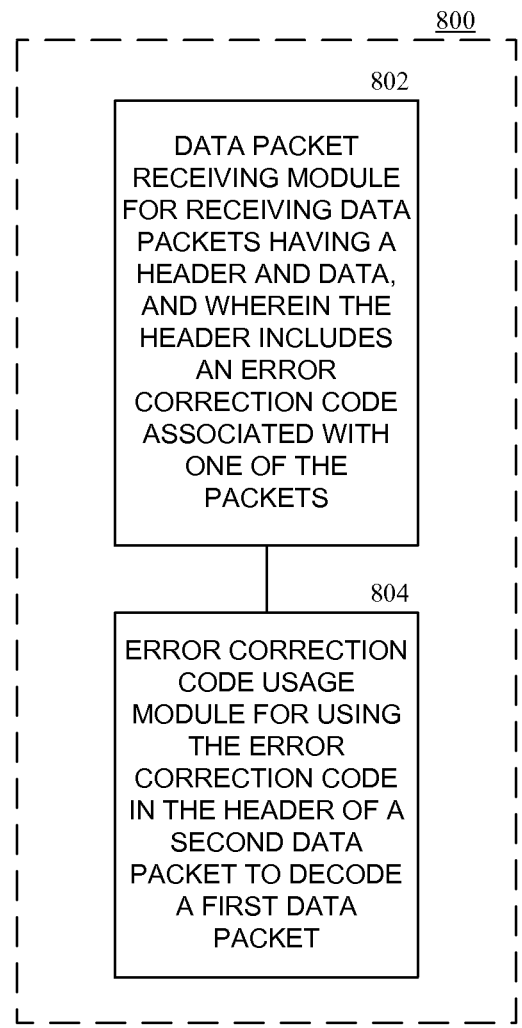
FIG. 8 is a block diagram illustrating an exemplary apparatus for wireless communications having various modules operable to receive and use error correction codes.

FIG. 8 is a block diagram illustrating an exemplary apparatus 800 for wireless communications having various modules operable to receive and use error correction codes. A data packet receiving module 802 is used for receiving a first data packet followed by a second data packet, wherein each of the first and second data packets includes a header and data, and wherein the header for the second data packet includes an error correction code associated with the first data packet. An error correction code usage module 804 uses the error correction code in the header of the second data packet to decode the first data packet from the data packet receiving module 802.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. The various illustrative logical blocks, modules, and circuits described in connection with the aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, Microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Moreover, in some aspects any suitable computer-program product may comprise a computer-readable medium comprising codes (e.g., executable by at least one computer) relating to one or more of the aspects of the disclosure. In some aspects a computer program product may comprise packaging materials.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising: a processing system configured to generate a first data packet and thereafter a second data packet, wherein each of the first and second data packets comprises a header and data, the processing system being further configured to generate an error correction code associated with the first data packet and embed the error correction code in the header of the second data packet, and wherein the processing system is further configured to compute an error detection code for the second data packet without the error correction code and include the error detection code in the header of the second data packet.

2. The apparatus of claim 1 wherein the processing system is further configured to compute the error detection code with source and destination addresses associated with the second data packet, the processing system being further configured to embed the error correction code in the header of the second data packet by replacing the source and destination address with the error correction code.

3. The apparatus of claim 2 wherein the source address comprises a BSSID and the destination address comprises a MAC address.

4. The apparatus of claim 1 wherein the processing system is further configured to generate a MAC packet comprising the first and second data packets.

5. The apparatus of claim 1 wherein the processing system is further configured to generate an aggregate data packet comprising the first and second data packets.

6. The apparatus of claim 5 wherein the processing system is further configured to append an additional header to each of the first and second data packets, each of the additional headers having information that identifies its respective data packet within the aggregate data packet.

7. The apparatus of claim 5 wherein the processing system is further configured to provide an indicator with the aggregate data packet indicating that the second data packet comprises the error correction code.

8. The apparatus of claim 7 wherein each of the data packets in the aggregate data packet comprises a MAC packet, the processing system being further configured to generate a physical layer packet having a header and data, wherein the data in the physical layer packet comprises the aggregate data packet, and wherein the processing system is further configured to embed the indicator in the header of the physical layer packet.

9. An apparatus for wireless communications, comprising: a processing system configured to receive a first data packet followed by a second data packet, wherein each of the first and second data packets comprises a header and data, and wherein the header for the second data packet comprises an error correction code associated with the first data packet, the processing system being further configured to use the error correction code in the header of the second data packet to decode the first data packet, and wherein the processing system is further configured to use the error correction code in the header of the second data packet to decode the first data packet in response to an error in a preceding attempt to decode the first data packet.

10. The apparatus of claim 9 wherein the first data packet comprises an error detection code, the processing system being further configured to use the error detection code in the preceding attempt to decode the first data packet to determine the error.

11. The apparatus of claim 9 wherein the second data packet comprises an error detection code, the processing system being further configured to decode the second data packet and use the error detection code to determine whether the second data packet is successfully decoded.

12. The apparatus of claim 9 wherein the processing system is further configured to receive a MAC packet comprising the first and second data packets.

13. The apparatus of claim 9 wherein the processing system is further configured to receive an aggregate data packet comprising the first and second data packets.

14. The apparatus of claim 13 wherein the each of the first and second data packets comprise an additional header, the processing system being further configured to use the additional headers to recover the first and second data packets from the aggregate data packet.

15. The apparatus of claim 13 wherein the processing system is further configured to use an indicator received with the aggregate data packet to determine that the second data packet comprises the error correction code.

16. The apparatus of claim 15 wherein each of the data packets in the aggregate data packet comprises a MAC packet, the processing system being further configured to receive a physical layer packet having a header and data, wherein the data in the physical layer packet comprises the aggregate data packet, and wherein the processing system is further configured to recover the indicator from the header of the physical layer packet.

17. An apparatus for wireless communications, comprising:
a processing system configured to receive a first data packet followed by a second data packet, wherein each of the first and second data packets comprises a header and data, and wherein the header for the second data packet comprises an error correction code associated with the first data packet, the processing system being further configured to use the error correction code in the header of the second data packet to decode the first data packet,
wherein the second data packet comprises an error detection code, the processing system being further configured to decode the second data packet and use the error detection code to determine whether the second data packet is successfully decoded, and
wherein the processing system is further configured to compute an error detection code associated with the second data packet without the error correction code in the header of the second data packet and compare the computed error detection code to the error correction code in the header of the second data packet to determine whether the second data packet is successfully decoded.

18. The apparatus of claim 17 wherein the processing system is further configured to compute the error detection code with source and destination addresses associated with the second data packet by replacing the error correction code in the header of the second data packet.

19. The apparatus of claim 18 wherein the source address comprises a BSSID and the destination address comprises a MAC address.

20. The apparatus of claim 17 wherein the processing system is further configured to use the error correction code in the header of the second data packet to decode the first data packet only if the second data packet is successfully decoded.

21. A method for wireless communications, comprising:
generating a first data packet and thereafter a second data packet, wherein each of the first and second data packets comprises a header and data;
generating an error correction code associated with the first data packet;
embedding the error correction code in the header of the second data packet;
computing an error detection code for the second data packet without the error correction code; and
providing the error detection code in the header of the second data packet.

22. The method of claim 21 wherein the error detection code is computed with source and destination addresses associated with the second data packet, and the error correction code is embedded in the header of the second packet by replacing the source and destination address with the error correction code.

23. The method of claim 22 wherein the source address comprises a BSSID and the destination address comprises a MAC address.

24. The method of claim 21 further comprising generating a MAC packet, the MAC packet comprising the first and second data packets.

25. The method of claim 21 further comprising generating an aggregate data packet, the aggregate data packet comprising the first and second data packets.

26. The method of claim 25 further comprising appending an additional header to each of the first and second data packets, each of the additional headers having information that identifies its respective data packet within the aggregate data packet.

27. The method of claim 25 further comprising providing an indicator with the aggregate data packet indicating that the second data packet comprises the error correction code.

28. The method of claim 27 wherein each of the data packets in the aggregate data packet comprises a MAC packet, the method further comprising generating a physical layer packet having a header and data, wherein the data in the physical layer packet comprises the aggregate data packet; and embedding the indicator in the header of the physical layer packet.

29. A method for wireless communications, comprising:
receiving a first data packet followed by a second data packet, wherein each of the first and second data packets comprises a header and data, and wherein the header for the second data packet comprises an error correction code associated with the first data packet; and
using the error correction code in the header of the second data packet to decode the first data packet,
wherein the error correction code in the header of the second data packet is used to decode the first data packet in response to an error in a preceding attempt to decode the first data packet.

30. The method of claim 29 wherein the first data packet comprises an error detection code, wherein the error detection code is used in the preceding attempt to decode the first data packet to determine the error.

31. The method of claim 29 wherein the second data packet comprises an error detection code, the method further comprising decoding the second data packet wherein the error detection code is used to determine whether the second data packet is successfully decoded.

32. The method of claim 29 further comprising receiving a MAC packet comprising the first and second data packets.

33. The method of claim 29 further comprising receiving an aggregate data packet, the aggregate data comprising the first and second data packets.

34. The method of claim 33 wherein the each of the first and second data packets comprise an additional header, and the method further comprising using the additional headers to recover the first and second data packets from the aggregate data packet.

35. The method of claim 33 further comprising using an indicator received with the aggregate data packet to determine that the second data packet comprises the error correction code.

36. The method of claim 35 wherein each of the data packets in the aggregate data packet comprises a MAC packet, the method further comprising receiving a physical layer packet having a header and data, wherein the data in the physical layer packet comprises the aggregate data packet, and the method is further comprising recovering the indicator from the header of the physical layer packet.

37. A method for wireless communications, comprising:
receiving a first data packet followed by a second data packet, wherein each of the first and second data packets comprises a header and data, and wherein the header for the second data packet comprises an error correction code associated with the first data packet;
using the error correction code in the header of the second data packet to decode the first data packet, wherein the second data packet comprises an error detection code, the method further comprising decoding the second data packet wherein the error detection code is used to determine whether the second data packet is successfully decoded;
computing an error detection code associated with the second data packet without the error correction code in the header of the second data packet; and
comparing the computed error detection code to the error correction code in the header of the second data packet to determine whether the second data packet is successfully decoded.

38. The method of claim 37 wherein the error detection code is computed with source and destination addresses associated with the second data packet by replacing the error correction code in the header of the second data packet.

39. The method of claim 38 wherein the source address comprises a BSSID and the destination address comprises a MAC address.

40. The method of claim 37 wherein the error correction code is used in the header of the second data packet to decode the first data packet only if the second data packet is successfully decoded.

41. An apparatus for wireless communications, comprising:
means for generating a first data packet and thereafter a second data packet, wherein each of the first and second data packets comprises a header and data;
means for generating an error correction code associated with the first data packet;
means for embedding the error correction code in the header of the second data packet means for computing an error detection code for the second data packet without the error correction code; and
means for providing the error detection code in the header of the second data packet.

42. The apparatus of claim 41 wherein means for computing is configured to compute the error detection code with source and destination addresses associated with the second data packet; and means for embedding is configured to embed the error correction code in the header of the second packet by replacing the source and destination address with the error correction code.

43. The apparatus of claim 42 wherein the source address comprises a BSSID and the destination address comprises a MAC address.

44. The apparatus of claim 41 further comprising means for generating a MAC packet, the MAC packet comprising the first and second data packets.

45. The apparatus of claim 41 further comprising means for generating an aggregate data packet, the aggregate data packet comprising the first and second data packets.

46. The apparatus of claim 45 further comprising means for appending an additional header to each of the first and second data packets, each of the additional headers having information that identifies its respective data packet within the aggregate data packet.

47. The apparatus of claim 45 further comprising means for providing an indicator with the aggregate data packet indicating that the second data packet comprises the error correction code.

48. The apparatus of claim 47 wherein each of the data packets in the aggregate data packet comprises a MAC packet, the apparatus further comprising means for generating a physical layer packet having a header and data, wherein the data in the physical layer packet comprises the aggregate data packet; and means for embedding the indicator in the header of the physical layer packet.

49. An apparatus for wireless communications, comprising:
means for receiving a first data packet followed by a second data packet, wherein each of the first and second data packets comprises a header and data, and wherein the header for the second data packet comprises an error correction code associated with the first data packet; and
means for using the error correction code in the header of the second data packet to decode the first data packet,
wherein the means for using the error correction code in the header of the second data packet is configured to use the error correction code in the header of the second data packet to decode the first data packet in response to an error in a preceding attempt to decode the first data packet.

50. The apparatus of claim 49 wherein the first data packet comprises an error detection code, and wherein means for using is configured to use the error detection code in the preceding attempt to decode the first data packet to determine the error.

51. The apparatus of claim 49 wherein the second data packet comprises an error detection code, the apparatus further comprising means for decoding the second data packet wherein the means for using is configured to use the error detection code to determine whether the second data packet is successfully decoded.

52. The apparatus of claim 49 further comprising means for receiving a MAC packet comprising the first and second data packets.

53. The apparatus of claim 49 further comprising means for receiving an aggregate data packet, the aggregate data comprising the first and second data packets.

54. The apparatus of claim 53 wherein the each of the first and second data packets comprise an additional header, and the apparatus further comprising means for using the additional headers to recover the first and second data packets from the aggregate data packet.

55. The apparatus of claim 53 further comprising means for using an indicator received with the aggregate data packet to determine that the second data packet comprises the error correction code.

56. The apparatus of claim 55 wherein each of the data packets in the aggregate data packet comprises a MAC packet, the apparatus further comprising means for receiving a physical layer packet having a header and data, wherein the data in the physical layer packet comprises the aggregate data packet, and the apparatus further comprising means for recovering the indicator from the header of the physical layer packet.

57. An apparatus for wireless communications, comprising:
  means for receiving a first data packet followed by a second data packet, wherein each of the first and second data packets comprises a header and data, and wherein the header for the second data packet comprises an error correction code associated with the first data packet;
  means for using the error correction code in the header of the second data packet to decode the first data packet, wherein the second data packet comprises an error detection code, the apparatus further comprising means for decoding the second data packet wherein the means for using is configured to use the error detection code to determine whether the second data packet is successfully decoded;
  means for computing an error detection code associated with the second data packet without the error correction code in the header of the second data packet; and
  means for comparing the computed error detection code to the error correction code in the second data packet to determine whether the second data packet is successfully decoded.

58. The apparatus of claim 57 wherein the computing means is configured to compute the error detection code with source and destination addresses associated with the second data packet by replacing the error correction code in the header of the second data packet.

59. The apparatus of claim 58 wherein the source address comprises a BSSID and the destination address comprises a MAC address.

60. The apparatus of claim 57 wherein the using means is configured to use the error correction code in the header of the second data packet to decode the first data packet only if the second data packet is successfully decoded.

61. A computer-program product for communication, comprising:
  a non-transitory machine-readable storage medium encoded with instructions executable to:
  generate a first data packet and thereafter a second data packet, wherein each of the first and second data packets comprises a header and data;
  generate an error correction code associated with the first data packet and embed the error correction code in the header of the second data packet;
  compute an error detection code for the second data packet without the error correction code; and
  provide the error detection code in the header of the second data packet.

62. A computer-program product for communication, comprising:
  a non-transitory machine-readable storage medium encoded with instructions executable to:
  receive a first data packet followed by a second data packet, wherein each of the first and second data packets comprises a header and data, and wherein the header for the second data packet comprises an error correction code associated with the first data packet; and
  use the error correction code in the header of the second data packet to decode the first data packet,
  wherein the error correction code in the header of the second data packet is used to decode the first data packet in response to an error in a preceding attempt to decode the first data packet.

63. An access point, comprising:
  a wireless network adapter configured to support a backhaul connection for a peer node to a network; and
  a processing system configured to generate a first data packet and thereafter a second data packet, wherein each of the first and second data packets comprises a header and data, the processing system being further configured to generate an error correction code associated with the first data packet and embed the error correction code in the header of the second data packet, and
  wherein the processing system is further configured to compute an error detection code for the second data packet without the error correction code and include the error detection code in the header of the second data packet.

64. An access terminal, comprising:
  a processing system configured to receive a first data packet followed by a second data packet, wherein each of the first and second data packets comprises a header and data, and wherein the header for the second data packet comprises an error correction code associated with the first data packet, the processing system being further configured to use the error correction code in the header of the second data packet to decode the first data packet; and
  a user interface supported by the processing system,
  wherein the processing system is further configured to use the error correction code in the header of the second data packet to decode the first data packet in response to an error in a preceding attempt to decode the first data packet.

* * * * *